US011862911B2

(12) United States Patent
Mortimer

(10) Patent No.: US 11,862,911 B2
(45) Date of Patent: Jan. 2, 2024

(54) INTEGRATED ELECTRICAL, LIGHTING, AND CHARGING SYSTEMS

(71) Applicant: Gregory Kenneth Mortimer, Scottsdale, AZ (US)

(72) Inventor: Gregory Kenneth Mortimer, Scottsdale, AZ (US)

( * ) Notice: Subject to any disclaimer, the term of this patent is extended or adjusted under 35 U.S.C. 154(b) by 302 days.

(21) Appl. No.: 17/341,664

(22) Filed: Jun. 8, 2021

(65) Prior Publication Data

US 2021/0384684 A1 Dec. 9, 2021

Related U.S. Application Data

(60) Provisional application No. 63/036,305, filed on Jun. 8, 2020.

(51) Int. Cl.

| | |
|---|---|
| ***H01R 25/00*** | (2006.01) |
| ***H01R 13/717*** | (2006.01) |
| ***F21V 23/06*** | (2006.01) |
| ***F21V 23/04*** | (2006.01) |
| ***H01R 25/16*** | (2006.01) |
| *F21Y 115/10* | (2016.01) |

(52) U.S. Cl.

CPC .......... *H01R 25/003* (2013.01); *F21V 23/04* (2013.01); *F21V 23/06* (2013.01); *H01R 13/7175* (2013.01); *H01R 25/161* (2013.01); *F21Y 2115/10* (2016.08)

(58) Field of Classification Search

CPC . H01R 25/003; H01R 13/7175; H01R 25/161

See application file for complete search history.

(56) References Cited

U.S. PATENT DOCUMENTS

| | | | | |
|---|---|---|---|---|
| 5,595,494 A * | 1/1997 | Wiebe | H01R 25/00 439/211 |
| 7,789,686 B2 * | 9/2010 | Kim | H01R 29/00 439/218 |

* cited by examiner

*Primary Examiner* — Phuong Chi Thi Nguyen

(74) *Attorney, Agent, or Firm* — SNELL & WILMER L.L.P.

(57) ABSTRACT

This disclosure includes a system and method for integrating a power and lighting system into one component for ease of installation under cabinets or other areas. The wiring may be split at the entrance into the chassis. Continuous power may be maintained at the receptacle locations while also powering the line voltage LED lighting via a control device such as, for example, a slide dimmer.

11 Claims, 2 Drawing Sheets

INTEGRATED ELECTRICAL, LIGHTING, AND CHARGING SYSTEMS

CROSS-REFERENCE TO RELATED APPLICATIONS

This disclosure claims priority to, and the benefits of, U.S. Provisional Patent Application Ser. No. 63/036,305 filed on Jun. 8, 2020 and titled "Integrated Electrical, Lighting, And Charging Systems", which is hereby incorporated by reference in its entirety for all purposes.

FIELD

This disclosure generally relates to power and lighting systems.

BACKGROUND

There has been a definite design push within the past several years for electrical, lighting, and charging systems to integrate seamlessly into our lives without being obtrusive in their design and ability to use. The cabinetry and casework industries have certainly seen changes in these features, but manufacturers have not designed, developed, and produced electrical, lighting, and charging systems as a single integrated unit that blend seamlessly into the current cabinet and casework designs. Moreover, the integration of these systems will help to remove some or all electrical devices from the backsplash area between the countertops and bottom of the upper wall cabinets so the design features associated with the backsplash may remain unencumbered.

SUMMARY

This disclosure includes a system and method for integrating a power and lighting system into one component for ease of installation under cabinets or other areas. The wiring may be split at the entrance into the chassis. Continuous power may be maintained at the receptacle locations while also powering the line voltage LED lighting via a control device such as, for example, a slide dimmer.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

Figure 1:
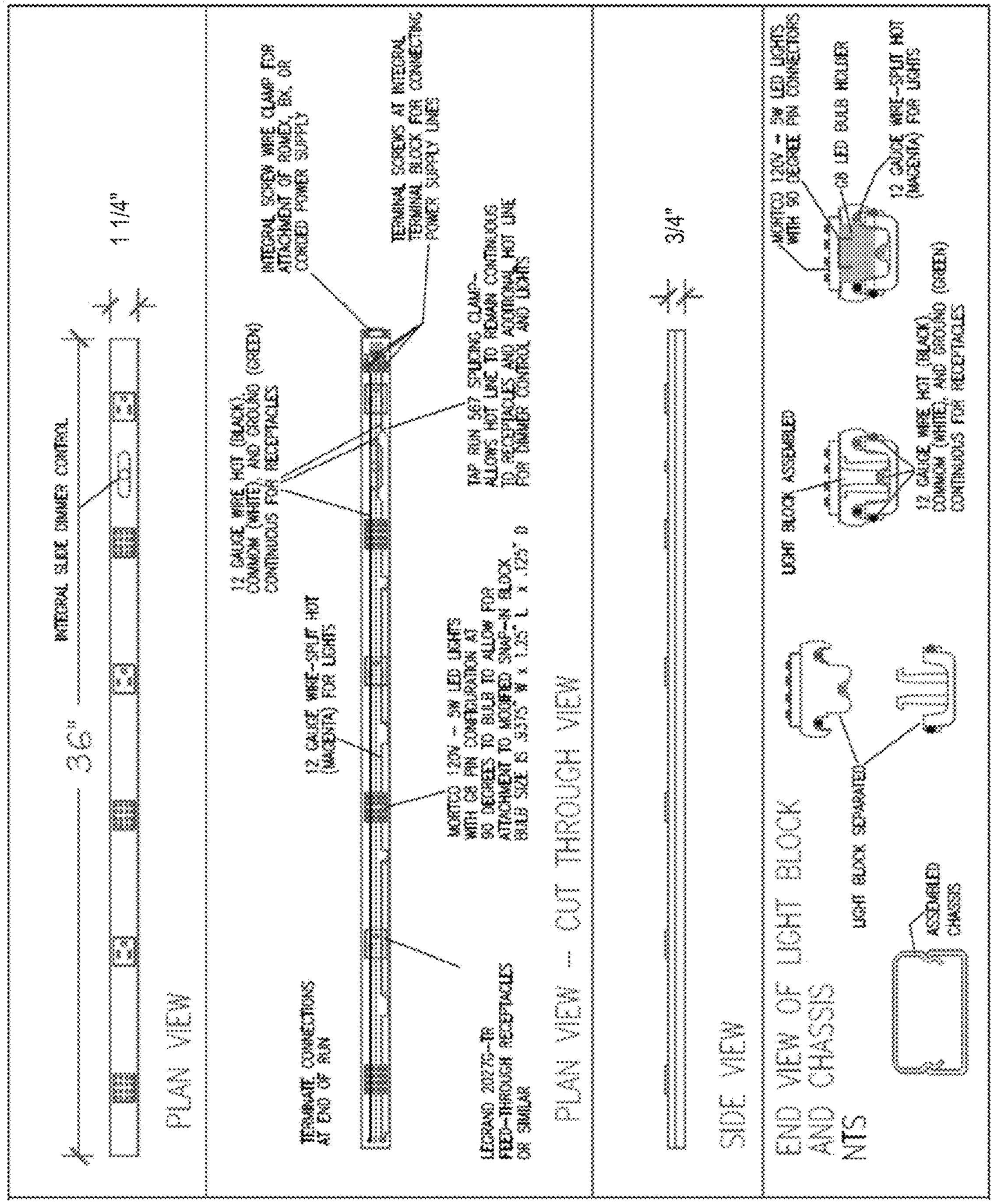
FIG. 1 is an exemplary drawing of the system, various components and exemplary wiring configurations, in according with various embodiments.

In various embodiments, as set forth in FIG. 1, the system includes a combination of power and lighting. The systems may be designed for the cabinetry and casework industry. The power, lighting, and charging technologies may be housed, out-of-sight, underneath and within the cabinetry and casework systems. One reason for using the system is to remove all electrical devices from the backsplash area between the countertops and bottom of the upper wall cabinets so the design features associated with the backsplash may remain unencumbered. The system is designed to be user and installer friendly with all systems having the ability to be installed with or without the use of licensed electricians depending on the systems selected for use.

The system allows for electrical, lighting, and charging systems to be combined into one discreet system that hides conveniently behind molding. For example, the system may hide behind a ¾" (20 mm) high light molding, or in the case of frameless cabinetry, within a 1⁵⁄₁₆" (33 mm) wide or 2¹⁄₁₆" (53 mm) wide by ¾" D (20 mm) channel depending on the lighting system selected. The systems may be available in corded or hardwired applications. The systems may be extended in intervals of 12" (30.48 cm) up to a total length of 20' (609.6 cm). The lighting for the systems may be line voltage LED lighting. The lighting may be capable of being dimmer controlled.

The system may be used by three levels of clientele: The do-it-yourselfer (DIY), the construction/cabinet installer, and the professional cabinetry company.

In various embodiments, systems are designed for the DIYer and include electrical, lighting, and charging ports that are positioned as required to meet most NEC conditions. The system is a single-circuit system with integrated electrical receptacles and LED lighting. For example, the receptacles and lighting may be located on 12" centers and one set of USB charging ports for 12", 24", and 36" lengths. Lighting may turned on and off via a slide dimmer switch (e.g., located at one end of the of the chassis body). The system may be available in hardwire and corded varieties and in 12", 24", 36", 48", 60", and 72" lengths. In various embodiments, the systems are designed to be energized via a GFCI receptacle installed in the cabinet above where the system is located that is recessed into the wall at 6" to 16" above the bottom of the cabinet. If hardwired, the feed from the load side of the GFCI may be attached to the system via a self-clamping romex connector and terminals for the hot, common, and ground wires. If corded, the cord is simply plugged into the GFCI receptacle. The wiring within the system features feed-thru 12 gauge copper wiring rated for 20 amps that is split at the entrance into the chassis. In various embodiments, continuous power is maintained at the receptacle locations while also powering the line voltage LED lighting via a slide dimmer installed on the exterior of the chassis. The chassis material may be steel with powder-coated finishes in white, almond, brown, and black.

In various embodiments, the systems may be designed for use by construction and cabinet installation specialists. The system may include electrical, lighting, and charging port "blocks" that the installer can position as required for their project or per the client's needs. The system may be a two-circuit system with one circuit energized for receptacles and charging ports and the other circuit to control the lighting systems. The two circuit system allows for lighting to be controlled via wall mounted dimmer switches and multiple systems to be controlled from one switching location.

Figure 2:
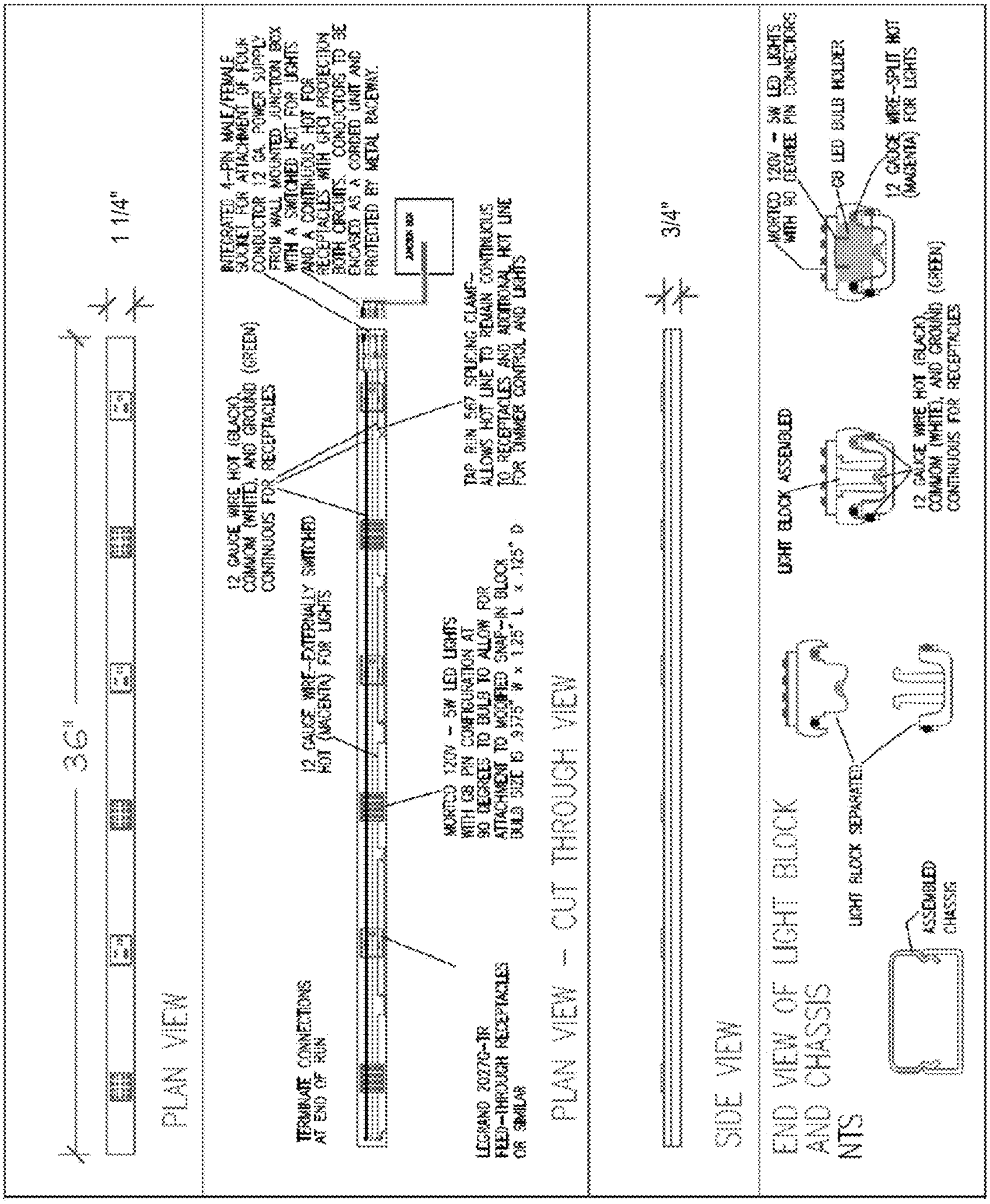
FIG. 2 is an exemplary 4-pin connection to the chassis having four conductors including a common (white), ground (green), continuous hot for the receptacles (shown in red but could be a black wire), and an externally switched hot for the LED lights (shown in magenta but could be a red wire), in according with various embodiments.

In various embodiments, as set forth in FIG. 2, the system may include a 4-pin connection to a two-circuit system. When hardwired, the system may include two separate feeds. In various embodiments, a first feed may be continuously hot for the receptacles and a second feed may be switched for the lights. Both the first and second feeds may be attached to the system via a 4-pin connecting wire with male/female 12 gauge conductors. The conductors may be wired into the system at a wall-mounted junction box. The conductors may be plugged into the chassis via the 4-pin connector with the chassis containing the male side of the connection and the 4-pin connecting wire containing the female side of the connection. A spring-loaded clamp may keep the connection secure at the chassis. The 4-pin connecting wire may be encased as a corded unit. The 4-pin connecting wire may be protected by a metal raceway (e.g., ¾" wide by ½" high) from where it leaves the junction box to the connection at the chassis. A similar pin connecting device system may be used for other models, but it may only include a 3-pin conductor.

Each specific length of chassis may have a specific number of block locations. For instance, a 36" long chassis has six block locations. The installer could position receptacle blocks at positions one, three, and five while positioning light blocks at positions two, four, and six. The specific block types (receptacle, lighting, or charging) connect to the chassis at the appropriate circuit designated for their block. The receptacle and USB port portions of the systems are designed to be energized via a GFCI receptacle installed in the cabinet above where the system is located that is recessed into the wall at 6" to 16" above the bottom of the cabinet. If hardwired, the feed from the load side of the GFCI is attached to the system via a self-clamping romex connector and terminals for the hot, common, and ground wires. If corded, the cord is simply plugged into the GFCI receptacle. The lighting portion of the Plug-N-Select system can be energized by directly wiring the switched line to the terminals within the chassis for hardwired applications or by plugging in the lighting cord to a switched receptacle for corded applications. The wiring within the system features feed-thru 12 gauge copper wiring rated for 20 amps. The Plug-N-Select system is available in hardwire and corded varieties (two cords) and in 12", 24", 36", 48", 60", and 72" lengths. Chassis material is steel with powder-coated finishes in white, almond, brown, and black.

In various embodiments, the systems are designed for the high-end cabinetry professional and are designed to be integrated into the design of the cabinetry whether the cabinetry is frameless or otherwise. The system offers two different lighting system options—continuous LED lighting and specific point LED lighting depending on the design and purpose of the lighting. In various embodiments, the systems include electrical, lighting, and charging port "blocks" that can be positioned as required for the project, and it is also a two-circuit system with one circuit for receptacles and charging ports and the other for lighting. If the continuous LED lighting option is desired, the designer has the option of using receptacle and charging port blocks as well as lighting blocks if needed. The system with continuous LED lighting may include the wider chassis system (2¹⁄₁₆" or 53 mm) and is available in hardwire and corded varieties (two cords) in 12", 24", 36", 48", 60", and 72" lengths. The systems are designed to be energized via two separate circuits with one circuit energized continuously while the other is a switched for the lighting control. Chassis material is available in natural milled aluminum or steel with powder-coated finishes in white, almond, brown, and black.

In various embodiments, connectivity from one system to another, or one unit to another, may be by joining the conductors together via wire nuts housed within the chassis and sliding one chassis into the next. In various embodiments, connectivity from one system to another, or one unit to another, may be via a male/female port system whereby one system simply plugs into the next. In various embodiments, connectivity from one system to another, or one unit to another, may be via a coupling whereby one system plugs into one side of the coupling and the other system plugs into the other side of the coupling.

12 gauge conductors within the system may be in the form of copper, or other conductor material, that are extruded or otherwise manufactured to be flat and/or rectangular/square in their shape and housed/insulated within the chassis system to aid in the transfer of electricity through the chassis system from one block type to the next block type and the connection of one chassis system to the next chassis system. Reshaping the conductors may allow for better positioning of the conductor within the chassis for high/low positioning in multi-circuit applications and better connection of the snap-in blocks to the conductor.

Blocks for receptacle and charging ports may have their conductors at specific height positions on both sides of the block which are different from the height positions for the lighting blocks. The differing height positions of the conductors on the blocks defines that a receptacle or charging port will only make contact with the conductors specific to its use in the chassis system while the lighting blocks only make contact with the conductors specific to its use in the chassis system. The differing of connections between the receptacle/charging port block types and the lighting block types is crucial in a multi-circuit system that allows for continuous connectivity to the receptacles and charging ports while also allowing the lighting to be controlled separately and remotely via a wall switch or remote control device.

The attachment of the systems to the cabinetry may be via the Strap-N-Snap attachment system for the systems whereby a spring-loaded U-shaped strap is first attached to the bottom of the cabinetry using ⅜" wood screws at multiple positions depending on the length of the chassis system. Once the straps have been secured to the bottom of the cabinetry the chassis is then snapped into the straps and held firmly in place. Strap-N-Snap allows for the installation of a corded system without the user/installer ever having to open the chassis system.

In various embodiments, the light blocks for the system may be designed, dimensioned, molded, and/or otherwise fabricated for use in any existing receptacle bar or chassis systems. For example, the WIREMOLD chassis system manufactured by Legrand North America LLC, which is hereby incorporated by reference for all purposes. The light blocks may replace a receptacle block in the existing system and fit properly into the system in substantial compliance with all aspects including, for example, the size requirement, the finish requirement, the conductivity requirement, and the ability to allow other conductors to pass through it or around it. The light block may possess the same ability for the rear assembly to be detached from the front assembly. This would allow for the conductors to feed through the light block assembly in the same manner as the existing receptacle assembly. This would also energize the light block assembly and the attached or built-in G8 bulb socket, or other bulb socket size, into which an LED bulb would be inserted. The LED bulb would have specific finished dimensions to substantially match the receptacle block cutout or any other cutout size within any existing chassis system.

Some of the differences between the present systems and prior systems with receptacle strips have to do with the joining of a lighting block system platform that works in conjunction with a receptacle block system platform, the internal wiring within the chassis system, the connection of the line voltage electrical wires to the system, the use of line voltage LED lighting, and the chassis system itself.

Exemplary purposes of the systems are to minimize the appearance of a combined lighting and receptacle based system that is hidden from appearance underneath the upper wall cabinets in a kitchen environment from a normal standing height, and, if seen, looks completely finished in its appearance. The system also includes an all-in-one lighting and receptacle format that meets the needs of design professionals and their clients at nearly any price point including entry level kitchens. The system also includes a system of lighting and receptacle products that are installer friendly, even to the point that a DIYer can install them.

For the industry professional, the system includes a system of combined lighting and receptacle based systems that can be seamlessly integrated into the cabinetry manufacturing process and meet the finish needs of the most discriminating clientele.

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A system comprising:
- a power system having receptacles;
- a lighting system having LED lighting;
- the LED lighting configured to light a workspace area;
- the power system and the lighting system are integrated into a chassis,
- a control device;
- wiring that is split into first wiring and second wiring at an entrance into the chassis,
- the first wiring interfaces with the power system and the second wiring interfaces with the lighting system;
- continuous power is maintained in the first wiring at the receptacles; the LED lighting being controlled via a control device;
- the control device including a slide dimmer, and
- the LED lighting being electrically controlled independently of the receptacles.

2. The system of claim 1, wherein the system is energized via a GFCI receptacle.

3. The system of claim 2, wherein a feed from a load side of a GFCI is attached to the system via a self-clamping romex connector and terminals for hot, common, and ground wires.

4. The system of claim 3, wherein the wiring includes
- at least one of a 3-pin or 4-pin connection to a two-circuit system including two separate feeds comprising the first wiring and the second wiring,
  - wherein the first wiring and the second wiring are attached via at least one of the 3-pin or the 4-pin connecting wire.

5. The system of claim 4, wherein the first wiring and the second wiring are attached via a 4-pin connecting wire with male/female 12 gauge conductors.

6. The system of claim 5, wherein the male/female 12 gauge conductors are wired into the system at a wall-mounted junction box.

7. The system of claim 6, wherein the male/female 12 gauge conductors are plugged into the chassis via the 4-pin connecting wire with the chassis containing the male side of the connection and the 4-pin connecting wire containing the female side of the connection.

8. The system of claim 7, wherein a spring-loaded clamp keeps the connection secure at the chassis.

9. The system of claim 8, wherein the 4-pin connecting wire is encased as a corded unit.

10. The system of claim 9, wherein the 4-pin connecting wire is protected by a metal raceway.

11. The system of claim 10, wherein the 4-pin connecting wire is protected by the metal raceway from where the 4-pin connecting wire leaves the junction box to the connection at the chassis.

* * * * *